July 14, 1953     R. EMERIAT     2,645,676
METHOD OF ASSEMBLING AND INSULATING
FLAT DRY CELLS
Filed Feb. 16, 1950
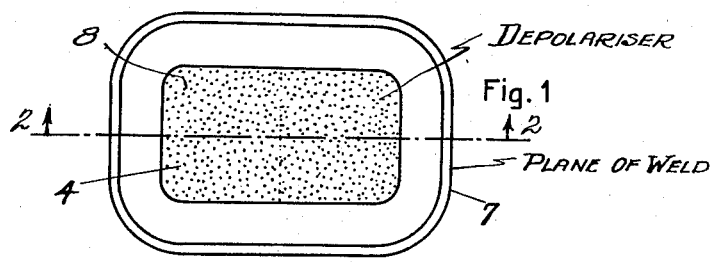
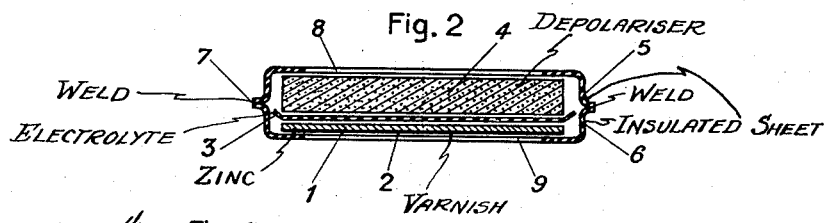
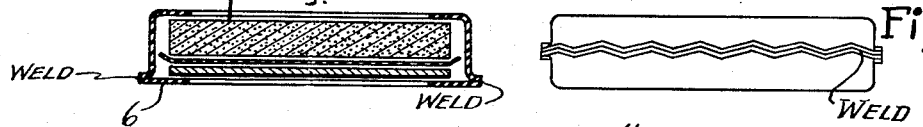
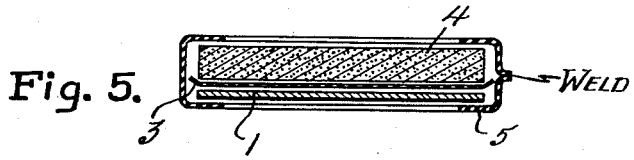
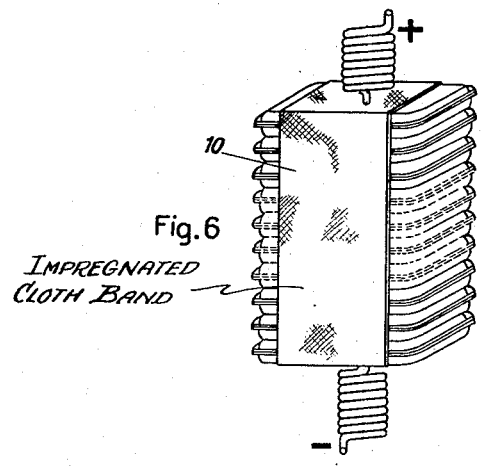
INVENTOR
RAYMOND EMERIAT
By Adams + Bush
ATTORNEYS Patented July 14, 1953

2,645,676

UNITED STATES PATENT OFFICE 2,645,676

METHOD OF ASSEMBLING AND INSULATING FLAT DRY CELLS

Raymond Emériat, Paris, France, assignor to Societe de la Pile Leclanche, Chasseneuil-du-Poitou, France, a company of France Application February 16, 1950, Serial No. 144,405
In France February 25, 1949

6 Claims. (Cl. 136—175)

This invention relates to dry cells and is more particularly concerned with a method of insulating a flat dry cell which may be used in a battery assembly.

The component parts of such a dry cell can be held in assembled form by applying to the outside of the active parts, a pre-formed envelope or tube of natural or synthetic plastic or elastic material which is then pressed onto the faces of the active parts. This form of assembly is somewhat delicate and has the disadvantage that the cells so produced are of irregular thickness.

According to the present invention, there is provided a method of assembling and insulating a flat dry cell, wherein at least one previously unformed flat sheet of insulating material is placed around the active parts of the cell so that the free edges of the sheet or sheets of insulating material contact each other along the side faces of the cell (i. e. along the thickness of the cell) and wherein the contacting edges of the sheet or sheets of insulating material are welded together, the insulating material assuming the desired form immediately before welding.

It is to be understood that by "insulating material" there is meant a natural or synthetic plastic material which may have slight elasticity and which is capable of insulating a dry cell in the required manner.

For a better understanding of the present invention and to show how it may be carried into effect, reference will now be made to the accompanying drawings in which, Figure 1 is a plan view of a dry cell covered with two sheets of insulating material.

Figure 2 is a sectional view of Figure 1, taken on the line A—B of Fig. 1,

Figures 3 and 4 show in section two modified methods of the employment of two sheets of insulating material for the covering, Figure 5 shows in section a modification employing a single sheet of insulating material for the covering, and Figure 6 is a perspective view of a battery of such dry cell elements.

In one embodiment of the invention (Figs. 1-4) the dry cell may be held together by means of two sheets of insulating material.

As shown in Figures 1 and 2, the dry cell has a strip 1, for example of zinc, the face of which directed towards the outside of the cell, is covered by a conductive varnish 2, and the other face of which has a thin coating of electrolytic paste spread on a sheet 3 of cellulose impregnated with electrolyte, and a depolarising mix cake or mass 4.

When a number of such dry cells must be stacked to build up a battery, the components are assembled with the aid of two sheets 5 and 6 of insulating material having central openings 8 and 9. The two sheets after having been shaped to the desired form are welded together in a central plane at 7, for example by high-frequency welding over the four side faces of the cell.

In Figures 1 and 2, rectangular openings 8 and 9 are shown in the upper and lower faces, but these openings may obviously be of any other shape, and each of them may be replaced by several openings, the only essential being that there is good electrical contact between two adjacent stacked cells.

The line along which the sheets 5 and 6 are welded is not necessarily straight, but may for example be of zig-zag form as shown in Figure 3.

The welding need not be in a central plane. In a modified form, Figure 4 shows that it may be effected around the lower face of the dry cell.

It is possible to effect the welding along any desired profile or line so as to give the cell a particular form.

In another embodiment of the present invention, a cell is assembled by using one single sheet of insulating material. Figure 5 shows a dry cell comprising a sheath obtained by folding a sheet of insulating material around one side face of the cell and then shaping it. The sheath is welded on its edges, by any suitable means on the other three side faces of the cell. The deformability under pressure, and the elasticity, if any, of the applied wrapped insulating material is such that, when the assembly is completed, after the welding of the contacting edges of the sheath, and the removal of any burrs which extend beyond the welding line, the sheath has a smooth appearance over its entire surface. The sheet or sheets of insulating material are shaped during their actual assembly on the dry cell. This method is preferable to the pre-shaping of insulating sheaths before their assembly around the components of the cell.

Cells insulated as described hereinbefore may be assembled to form a battery as shown in Figure 6. The assembly may be locked together by any suitable temporary means and the permanent union effected by one or more narrow strips of cloth 10 impregnated, if desired, with a plastic material. Such plastic material may be polyvinyl chloride having its ends stuck together by a varnish which has a base of some plastic material.

I claim:

1. In a mode of mounting and of isolation for an element of a plurality of superposed flat constituents for a dry plate battery, the steps consisting of inserting the flat element between two sheets of flexible thermoplastic insulating material provided with openings for receiving electric contacts on the two faces of the element, shaping into form the sheets along the length of the faces and of the edges of the constituents of the element in such manner as to provide a small annular chamber around the edges of the constituents of the element, then welding and simultaneously cutting off by heat the two sheets according to their line of contact around the edges of the constituents, so that the element is finally enveloped in a covering in one single smooth piece on all of its surface outside of the welding line.

2. In a mode of mounting and of isolation for an element of a plurality of superposed flat constituents for a dry plate battery, the steps consisting of inserting the flat element between the two portions of a sheet of flexible thermoplastic insulating material folded double and provided with openings for receiving electric contacts on the two faces of the element, shaping into form the sheets along the length of the faces thereof and of the edges of the constituents of the element, the element being applied between the two folded portions of the sheet immediately adjacent the folding line thereof, in such manner as to provide a small annular chamber around the edges of the constituents of the element, then welding and simultaneously cutting off by heat the two portions of said sheet according to their line of contact around the edges of the constituents, so that the element is finally enveloped in a covering in one single smooth piece on all of its surface outside of the welding line.

3. A mode of mounting according to claim 1, said step of welding and simultaneously cutting off by heat being carried out by applying high frequency welding, the whiskers becoming separated after welding.

4. A mode of mounting according to claim 1, said welding line lying in the median plane of said element intermediate faces thereof.

5. A mode of mounting according to claim 1, said welding line lying substantially in the plane of one of the faces of said element.

6. A mode of mounting according to claim 1, said welding line being zig zag.

RAYMOND EMÉRIAT.

References Cited in the file of this patent

UNITED STATES PATENTS

| Number | Name | Date |
|---|---|---|
| 1,174,593 | McClurg | Mar. 7, 1916 |
| 1,793,710 | Milmoe | Feb. 24, 1931 |
| 1,863,713 | Connor | June 21, 1932 |
| 2,086,735 | Neumiller | July 13, 1937 |
| 2,106,276 | Heineman | Jan. 25, 1938 |
| 2,210,509 | Strauch | Aug. 6, 1940 |
| 2,275,967 | Keillar et al. | Mar. 10, 1942 |
| 2,302,846 | Farmer et al. | Nov. 24, 1942 |
| 2,307,764 | Deibel et al. | Jan. 12, 1943 |
| 2,307,770 | Deibel | Jan. 12, 1943 |
| 2,355,197 | Anthony et al. | Aug. 8, 1944 |
| 2,416,079 | Anthony | Feb. 18, 1947 |
| 2,519,527 | Wilkinson | Aug. 22, 1950 |
| 2,536,697 | Ruben | Jan. 2, 1951 |

FOREIGN PATENTS

| Number | Country | Date |
|---|---|---|
| 530,859 | Great Britain | Dec. 23, 1940 |
| 556,907 | Great Britain | Oct. 27, 1943 |
| 118,812 | Australia | Aug. 24, 1944 |
| 235,835 | Switzerland | May 1, 1945 |
| 957,201 | France | Aug. 22, 1949 |
| 985,992 | France | Mar. 21, 1951 |